United States Patent [19]

Michele et al.

[11] Patent Number: 4,837,540
[45] Date of Patent: Jun. 6, 1989

[54] MAGNETIC WORK-HOLDER

[75] Inventors: Cardone Michele; Grandini Angelo; Zaramella Bruno, all of Milano, Italy

[73] Assignee: Tecnomagnete S.p.A., Milan, Italy

[21] Appl. No.: 252,882

[22] Filed: Oct. 3, 1988

[30] Foreign Application Priority Data

Oct. 12, 1987 [IT] Italy .................. 22227 A/87

[51] Int. Cl.$^4$ .............................. H01F 7/20
[52] U.S. Cl. ................................ 335/286; 335/295
[58] Field of Search ............... 335/285, 286, 289, 291, 335/295

[56] References Cited

U.S. PATENT DOCUMENTS 3,854,711 12/1974 Dong ........................ 335/286 X
3,895,332 7/1975 Box .......................... 335/286
4,777,463 10/1988 Cory ......................... 335/286 X Primary Examiner—George Harris
Attorney, Agent, or Firm—Beveridge, DeGrandi & Weilacher

[57] ABSTRACT

A magnetic holding device, comprising magnetically activable holding surface having pole members of different polarities, and at least a first and a second single-pole extension members for said pole members of opposite polarities. Each pole-extension member comprises a base portion fastened to a pole member and a movable portion sliding on said base portion along an inclined surface the sliding surfaces of said first and second pole-extension members are slanted in opposite angular directions in respect to said holding surface of the device.

9 Claims, 2 Drawing Sheets

MAGNETIC WORK-HOLDER

BACKGROUND OF THE INVENTION

The present invention refers to an improved magnetic holding device such as a magnetic chuck or work-holder used on lifting apparatus and machine tools, and particularly relates to a magnetic holding device provided with pole extension members to adequately support and magnetically retain iron pieces.

In the field of magnetic work-holding apparatus, for example for holding work-pieces on machine tools, there is the problem of holding the work-piece without causing any distortion while the piece is being machined or when the work-piece is magnetically gripped on the activated device, due to magnetic attraction forces on the piece by the holding surface. A magnetic work-holding apparatus is described for example in U.S. Pat. No. 4,356,467 and U.S. Pat. No. 4,507,635 of the same inventors.

This problem exists in the majority of cases and is due to the elastic deformation caused by magnetic forces on the work-pieces which tend to reassume their initial shape when they are released, defeating all working precision.

There is at present no specific system for solving this problem, except for placing suitable wedges or shimming pieces between the piece or the pieces to be held and the holding surface of the magnetic device, so that any distortion of the pieces is limited, by preventing them from adapting to the holding surface.

The efficacy of this type of system is nevertheless extremely limited in that mechanical shimming lacks precision, involves additional air gaps that worsen circulation conditions of the useful magnetic flux and it cannot be practically applied to pieces with large surfaces both because of difficulty in ascertaining the exact points where the shims should be placed and because of difficulty in inserting the shims.

Another known system provides for lateral clamping of the single pieces to avoid any compression towards the holding surface; however, this system prevents high working forces from being developed in any case so as to cause distortion and makes it necessary to work on the piece repeatedly in a light manner, until a face that will then serve as a final reference face for later machining is achieved.

In the field of magnetic lifting apparatus it is also know the use of pole-extension pieces that are mobile only in a longitudinal direction to improve magnetic flux circulation conditions, without actually contributing to holding the piece to be lifted, since they do not afford sufficient force to hold back the piece in the sliding direction, unless they abut onto stop surfaces; in this way no adjustment of the pole piece position is possible. Practical results obtained with similar apparatus are scant and cannot be adopted on machine tools.

From U.S. Pat. No. 3,089,986 it is also known a multi-pole magnetic jig for use with magnetic chucks in which the jig comprises a lower portion and an upper mobile portion having a plurality of pole-extension members to adapt to the top plate of a magnetic work-holding device. The upper and lower portion of the jig are abutting on slanted or inclined surfaces allowing the upper portion to slide on the lower portion to adjust the high of the jig; a slug is forced into a hole of the lower portion urging against a side of a guiding ridge of the upper portion to prevent movement in the adjusted condition. Therefore U.S. Pat. No. 3,089,986 does not suggest or describe a magnetic apparatus having pole-extension members automatically adapting to the shape and local deformations of a work-piece to be hold.

An object of the present invention is to provide a work-holding apparatus having pole-extension members that automatically adapt to the surface of the pieces to be held, allowing high circulation of useful flux to minimize dispersions, allowing at the same time a firm hold of the pieces.

A further object of present invention is to provide a single-pole extension members of the type referred to, particularly suitable for application on pole pieces of a magnetic holding surface of a work-holding apparatus for machine tools and the like, that make it possible to operate with high working forces allowing considerable amounts of material to be removed right from the beginning of each machining and the piece to be firmly held and supported so that it is not subjected to any distortion. In this way the precision of matching is highly improved and made comparable to the machine tool's tolerances. Moreover optimal flux circulation conditions can be obtained by eliminating air gaps between the pole extension members and the work-piece, thus increasing the force by which the work-pieces are held and the working ability of the machine tool, it being possible to remove more material from the work-piece at each cut of the tool than is possible with known systems.

Yet a further object of the present invention is to provide a magnetic holding device provided with pole extension members appropriately arranged on the aforesaid adhering surface of a work-piece to ensure that pieces of any size are held firmly and securely, preventing any displacement by the forces caused by the working tool.

SUMMARY OF THE INVENTION

These and other objects of the present invention can be achieved with a magnetic work-holding device comprising in combination: a magnetically activable and deactivable holding surface having pole pieces of different polarities, and pole extension members for the pole pieces of said holding surface, said pole-extension members comprising a fixed pole portion and a movable pole portion sliding on an inclined surface, characterized in that said pole extension members comprise at least a first and a second single-pole extension members set on respective pole pieces of opposite polarities, each of said first and second pole extension members comprising a base portion fastened to a pole member and at least one movable pole portion, said base and movable pole portions having abutting faces angularly disposed in respect to said holding surface, said movable pole portion of said pole extension member having an outwardly oriented work-holding face, and guiding means for guiding said movable pole portion, said abutting faces of the base and movable portions of said first and second pole extension members being slanted in opposite angular directions.

According to an alternative embodiment of the present invention provision is made for a biasing means acting on the movable portion of the pole extension member to return it from a retracted to a totally extended condition.

BRIEF DESCRIPTION OF THE DRAWINGS

The invention will now be better illustrated with reference to the attached drawings in which.

DESCRIPTION OF THE INVENTION

Figure 1:
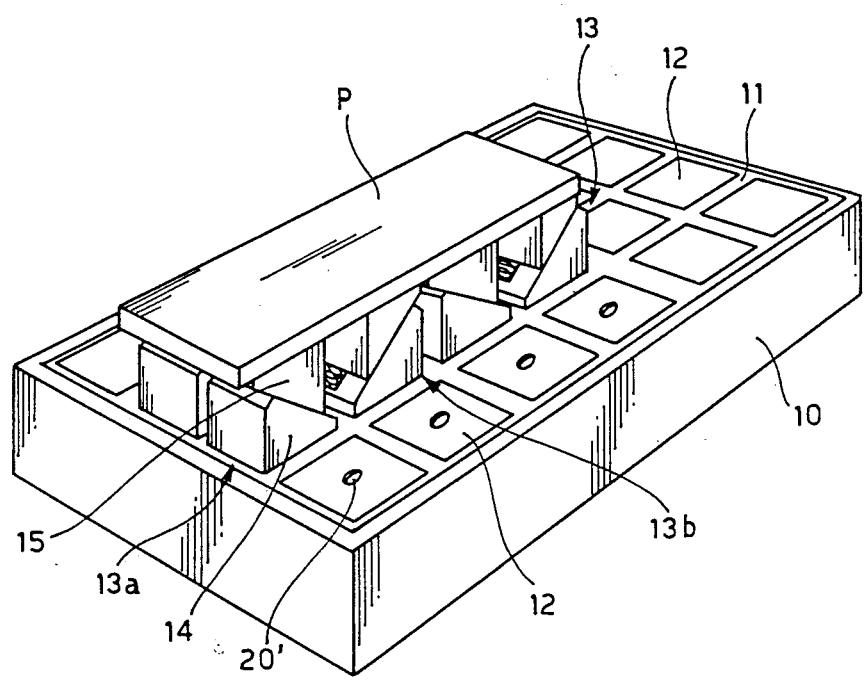
FIG. 1. is a perspective view of a magnetic holding device provided with pole extension members according to the present invention.

FIG. 1 shows a work-holding magnetic device 10, for example a permanent magnet apparatus, which is activated and deactivated in a per se known manner; the device 10 has a magnetic holding surface 11 defining a reference plane provided with a plurality of pole pieces 12, for example square-shaped pole pieces having opposite polarities N and S which receive magnetic energy from an internal magnet system, not shown, of the type described and illustrated for example in the previous patents of the same inventors. Pole extension members 13a, 13b are fixed to at least a first and second pole pieces 12 of opposite polarities of the magnetic holding device 10, to support and hold a ferromagnetic work-piece P that must, for example, be machined by a machine tool, such as a milling machine or the like.

As schematically shown in FIGS. 2 to 5, each pole extension member 13a, 13b is in the form of a single-pole member for a respective pole piece of the holding surface 11; each pole extension member 13a, 13b consists of a base pole portion 14 fixed to a pole piece 12 and a upper or mobile pole portion 15 which can slide along an inclined surface defined by slanted abutting faces 16, 25 between the base and mobile pole portions 14, 15. In particular, as shown in the figures, the base portion 14 of each pole extension member 13a, 13has side walls and a bottom square-shaped face 17 having the same size as the upper surface of each pole piece 12 of the holding device to provide continuity to the magnetic flux conducting section, minimizing the causes of magnetic leakages and reduction of the magnetic force. Opposite to bottom face 17 the base portion 14 of each pole-extension member 13'a, 13b has upwardly facing face 16, defining an inclined plane slidingly supporting the mobile portion 15 provided with similarly inclined bottom face 25; the sliding plane of the abutting faces 16, 25 of base and mobile portions 14, 15 forms an angle of between 15° and 80°, preferably between 40° and 50°, with the holding surface 11 of the apparatus 10.

The lower fixed portion 14 has fastening means comprising an axial hole 18 between the upper slanted face 16 and the bottom face 17, for the passage of a fastening screw 19 which screws into a corresponding threaded hole 20' provided in each pole piece 12 of the magnetic device 10, as shown.

Figure 5:
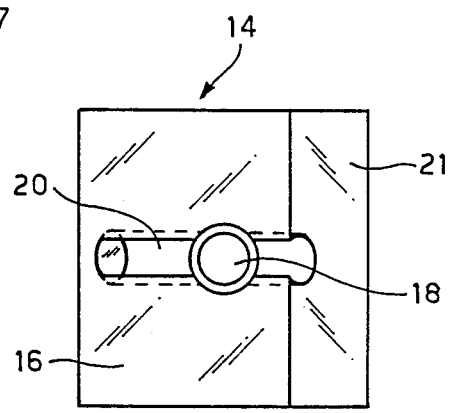
FIG. 5 is a top view of the base pole extension member.

A longitudinal slot 20 is provided on the inclined upper face 16 of base portion 14 of each pole extension members 13a, 13b, starting from an inclined side surface 21 opposite to the inclined face 16 and ending at a distance from the lower edge of said face. As can be seen in FIG. 5, the width of the slot 20 on the inclined face 16 is smaller than the maximum inside width of the same slot to form a longitudinal guide means for a pin 22 fastened, for example by screws 23, to the inclined bottom face 25 of the movable pole portion 15 which comes to be opposed to and rest on the similar inclined face 16 of the base pole portion 14.

In this specific case the movable pole portion 15 has an upper flat face 26 for magnetically gripping the work-piece P, said face 26 being disposed parallel to the bottom surface 17 of the base pole portion 16, that is to holding surface 11 of the magnetic work-holding device; however it is obvious that said surface 26 could have a different shape or disposition, without departing from the principles of the present invention.

Figure 2:
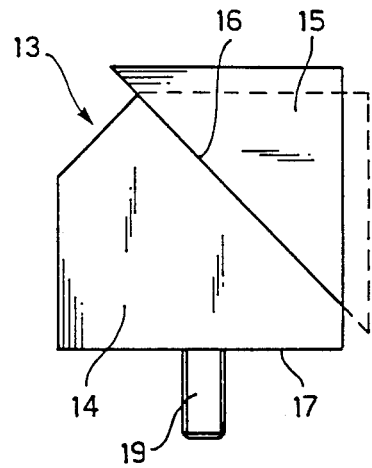
FIG. 2 is a side view of a pole extension member of FIG. 1, suitably provided for square shaped poles.
Figure 3:
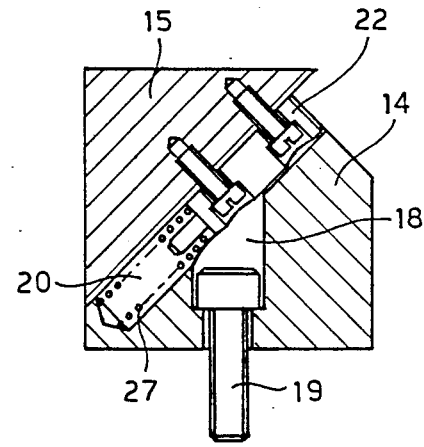
FIG. 3 is a longitudinal sectional view of the pole extension member of FIG. 2.
Figure 4:
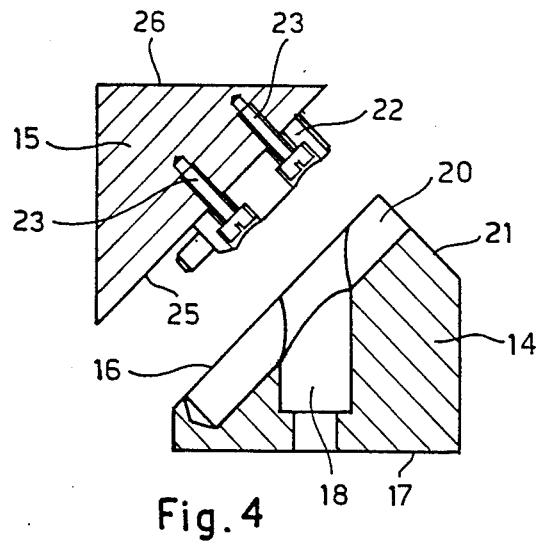
FIG. 4 is an exploded view of the pole piece in FIG. 3.

As shown in FIGS. 3 and 4 the guide pin 22 slides in the slot 20 and its axial length is less than that of the aforementioned slot to allow for sliding movement of the movable portion 15 of the pole extension member on the inclined face 16 of the base portion 14; therefore, causing the movable portion 15 to slide on base portion 14, said movable portion is allowed to move both in vertical and horizontal directions passing from an advanced or extended condition shown with a continuous line in FIG. 2, to a retracted condition shown by dashed lines in the same figure, in which the pole piece shows its minimum hight extension.

In the case of FIG. 3, a spring 27 or other biasing means is provided between the bottom of the slot 20 and the opposite end of the guide pin 22 to urge the movable portion 15 in the extended condition; stop means may be provided to stop the movable upper portion 20 in said extended and retracted positions, for example the direct contact of the end of the pin 22 or an extension thereof with the bottom of the slot 20 may act as a stop means.

The pole pieces 13a and 13b can be arranged and oriented in any way on the surface 11 of the device, however to prevent that the sliding movement of the upper movable pole portion 15 will tend to cause a displacement of the work-piece P, according to the invention it is necessary that a pair of adjacent pole extension members 13a, 13b or in general at least two of said pole extension members should be disposed so that their inclined abutting faces 16, are opposed to one another and slanted in opposite angular directions in respect to holding surface 11 of the device; therefore, when apparatus is magnetically activated, a sliding movement of the portion 14 of a pole extension member 13a will be opposed to the sliding movement of the movable portion 15 of the second pole extension member 13b acting on the work-piece P with forces having opposite directions; the interaction of the magnetic forces on the work-piece P and the opposite angular direction of said slanted faces 16, on a pair of pole extension members 13a and 13b practically prevent the work-piece P to be displaced by any external force or cause.

Operation of the magnetic apparatus with pole extension members having movable pole portions 15 according to the present invention is as follows: in the deactivated condition of device 10, the upper mobile portion 15 of each pole extension member 13a, 13b is pushed by the spring 27 in its initial extended position. When a piece P to be machined is placed on the pole extension members 13a, 13b or on some of them, the mobile pole portions 15 of the involved pole extension members, under the weight of the work-piece P are lowered consequently compressing the springs 27. Since each movable portion 15 can slide independently on the inclined abutting face 16 of the corresponding base portion 14, the distance of the resting face 26 for the piece P in each pole extension member, from the fixed reference plane 11 of the magnetic device 10, will vary automatically adapting the lenght or height of each single pole extension member to local distortions or deformations of the piece P. Therefore providing a set of pole pieces 12 of the holding device, as shown in FIG. 1, having opposite polarities, with a corresponding set of single-pole extension members 13a, 13b, makes it possible to obtain a resting surface for work-pieces P that is able to adapt automatically to the distortions and deformation in shape of the same pieces. This adaptation, in the case shown in which the pole extension members 13a, 13b are provided with a spring 27 to keep the mobile portion 15 at the maximum extended position, takes place when the magnetic apparatus 10 is still deactivated. If the sliding of the mobile part 15 on the inclined plane can be kept within certain limits, the biasing spring 27 could even be eliminated since adaptation to piece P would occur during activation of the apparatus.

In both cases, once the device 10 has been magnetically activated, the movable portions 15 of all the pole estension members 13a, 13b already adapted to the shape of the piece P, will remain magnetically locked in their positions, opposing to any movement of workpiece P both in vertical and horizontal directions by virtue of the opposite actions of the inclined faces 16, 25. In fact, as explained above, the slanted arrangement of the sliding surface 16 for the movable portion 15 on the base portion 14 of each pole extension members, will allow movement in the direction of the longitudinal axis of the base portion 14, i.e. at right angle to reference place 11 of the apparatus, provided that a corresponding lateral movement of the same movable portion 15 will be made possible. However, the considerable magnetic and frictional forces existing between the piece P and the movable portions 15 oppose this lateral movement. In fact, due to the high friction coefficient between contacting metal surfaces, the force needed to cause a slippage between the movable portion 15 of each pole extension member and the piece P can be estimated at about 25% to 30% of the magnetic attraction force; this force, being high, therefore prevents the parts from sliding with respect to each other and thus prevents the movable portion from becoming detached or yelding to the vertical and horizontal forces exerted by a tool, remaining firmly adhered against the inclined surface 16. The continuity and steadiness of the contact between the pole extension members and the piece P also make it possible to reduce and minimize air gaps, reducing the causes of magnetic leakage so that the flux is fed toward the piece to be held. In this way high holding forces and extremely reliable operation are achieved, without needing to use high magnetomotive forces in the magnetic circuit of the device. Besides good reliability and secure positioning of the piece, an apparatus is obtained at a limited cost and weight, as much as 50% lower than conventional apparatus in some cases, with all the related advantages.

An apparatus provided with pole extension members as described above has been proved to be extremely useful in magnetic holding devices for use on machine tools, since they allow exact, secure positioning of the piece P that can therefore have up to five faces free for machining, with no need to resort to clamping or additional anchoring or supporting devices; these pole pieces can also be used advantageously upside-down on magnetic lifting and conveying apparatus. In this case, the pole extension members being in an upside-down position, the movable portion 15 will come to be in the fully extended position even in the absence of biasing means, the weight of the movable portion itself being sufficient to make it slide downward. When it comes to rest on the piece to be lifted, said movable portion 15 of the pole piece will tend to retract for the lenght necessary to compensate for local distortion or different thickness of the piece P, thus allowing all the pole extension members involved to come into direct contact with the aforementioned work-piece. Once the apparatus has been magnetically activated, the two parts 14 and 15 of each pole extension member will lock into their relative positions, as described above, firmly holding the piece to be lifted. In fact in this case too, when the magnetic lifting device is activated sliding of the movable portions will be prevented by their firm adhesion to the piece P magnetically held, which will prevent any relative movement and therefore any movement in axial and lateral directions with respect to the pole extension members.

In all cases a magnetic holding device is obtained that is capable of adapting even to considerably distorted pieces, maintaining high efficiency.

Figure 6:
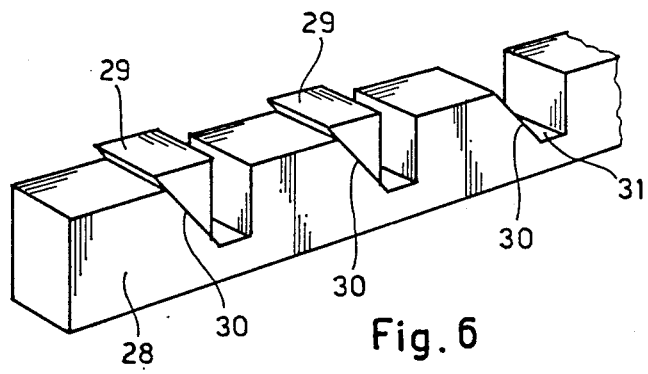
FIG. 6 shows schematically a further embodiment of a pole extension member for elongated pole members, provided with several and independent upper mobile portions.

Although the invention lends itself to advantageous application on magnetic devices with square or symmetrically arranged poles, it is obvious that other modifications or adaptations are possible. For example the same pole extension members could have only one base portion 14 and two or more movable portions 15 each sliding on its own inclined face 16, with the inclined surfaces of the same pole extension member being oriented in the same direction or in different directions. The invention described may nevertheless also be applied to devices having elongated poles members; in this case as shown in FIG. 6 each pole extension member comprises an elongated base portion 28 whose length and width correspond to those of the magnetic poles of the apparatus; the base portion 28 has, as suitable set distances, transversal slots 31 having on one or both opposite sides an inclined sliding surface 30 for a movable portion 29, in a similar manner to that of the pole-extension member described in the preceding figures. In figure 6 the surfaces 30 are all oriented and slanted in the same direction, however it is obvious that they could be oriented and slanted in opposite directions, or similar pole-extension members could be arranged on the same holding device with the surfaces 30 sloping in opposite directions. Moreover a pole-extension member has been described as separated part that is suitable for fastening to the pole members of a magnetic holding device, however it is obvious that the pole extension member according to the invention can be an integral part of the magnetic poles of the apparatus, for example by making the base pole part 14, 28 integral with a magnetic pole piece of the apparatus.

What is claimed is:

1. A magnetic work-holding device comprising a magnetically activable and deactivable holding surface having pole pieces of different polarities, and pole extension members for said pole pieces, said pole extension members comprising at least a first and second single-pole extension members set on respective pole pieces of opposite polarities, each of said first and second pole extension members comprising a base pole portion and at least a movable pole portion, said base and movable pole portions having abutting faces angularly disposed in respect to said holding surface, said movable pole portion of said pole extension members having an outwardly oriented work-holding face, and guiding means for guiding said movable pole portion on said base pole portion, said abutting faces of the base and movable pole portions of said first and second pole extension members being slanted in opposite angular directions.

2. A device according to claim 1, in which said slanted abutting faces form an angle of between 15° and 80°, preferably between 40° and 50° with respect to the said holding surface.

3. A device according to claim 1, in which means are provided for fastening the base pole portion of said pole-extension members to the magnetic holding surface.

4. A device according to claim 1, further comprising biasing means urging said movable pole portion towards an extended position.

5. A device according to claim 1, in which said pole-extension member comprises a base pole portion and at least a first and a second movable pole portions, the sliding surface for said movable pole portions being slanted in the same angular direction.

6. A device according to claim 1, in which said pole-extension member comprises a pole base portion and at least a first and a second movable pole portions, the sliding surface for said movable pole portions being slanted in opposite angular directions.

7. A device according to claim 1, in which said pole-extension member comprises a pole base portion and at least a first and a second movable pole portions, the sliding surface for said movable pole portions being slanted in different angular directions.

8. A device according to claim 1, in which said pole-extension member is in the form of a square-shaped member.

9. A device according to claim 1, in which said pole-extension member is in the form of an elongated member.

* * * * *